United States Patent Office 3,074,778

Patented Jan. 22, 1963

3,074,778

PROCESS FOR PRODUCING FERROMAGNETIC CHROMIUM OXIDE

Norman L. Cox, Claymont, Del., assignor to E. I. du Pont de Nemours and Company, Wilmington, Del., a corporation of Delaware No Drawing. Filed Sept. 24, 1959, Ser. No. 841,964

11 Claims. (Cl. 23—145)

This invention relates to a method for preparing ferromagnetic materials and to novel products produced thereby. More particularly, this invention relates to a method for preparing ferromagnetic chromium oxide and to a novel ferromagnetic chromium oxide of low coercive force produced thereby.

Ferromagnetic materials are employed in a variety of applications, including sound and video recording members, memory devices, and as coil cores in electronic equipment. In some of these applications, products of high coercive force are desired while others require low coercive force materials. Among the ferromagnetic materials available for such applications is ferromagnetic chromium oxide. This oxide has been produced from chromium trioxide by high pressure, hydrothermal methods with a coercive force above 35 oersteds as described in French Patent 1,154,191 and at atmospheric pressure in antimony-modified form with a coercive force of 100–400 oersteds. Although other modifications have been reported, no ferromagnetic chromium oxide of low coercive force has heretofore been described.

It is an object of this invention to provide high purity ferromagnetic chromium oxide. A further object is to provide a simple and practical process for obtaining crystalline ferromagnetic chromium oxide of high purity. Another object is to provide ferromagnetic chromium oxide having a coercive force below 25 oersteds and processes for its preparation. Still another object is to provide high purity ferromagnetic chromium oxide especially useful in such applications as transformer cores and chokes.

These and other objects of this invention are obtained by providing a process which comprises decomposing thermally chromyl chloride in the presence of a substrate consisting of inorganic fibers having melting points above the reaction temperature. When certain substrates are employed as described below, the ferromagnetic chromium oxide produced exhibits low coercive force, i.e., a coercive force below 25 coersteds.

Fibers suitable for use as substrates in the process of this invention include those composed of titanium dioxide, alumina, soft and heat-resistant glasses, high silica glasses and silica-alumina compositions. For rapid conversion of chromyl chloride to ferromagnetic chromium oxide, such fibers should be less than 50 microns, preferably less than 10 microns, in minimum dimension and have an axial ratio, i.e., a ratio of longest to shortest dimension of at least 10:1 and preferably 100:1 or more. Other inorganic materials, e.g., boehmite, capable of being produced in fibrous form can also be employed. It is, of course, essential that the fiber substrate have a melting point above the reaction temperature.

The process of this invention is carried out at temperatures in the range of 350–500° C. The most effective temperature for rapid conversion of chromyl chloride to high purity ferromagnetic chromium oxide within this range depends on the choice of inorganic fiber substrate. With titanium dioxide fibers having a rutile structure, it is desirable that the temperature be in the range of 350–400° C. and excellent results have been obtained at 360–380° C. With fibers of soft and heat-resistant glasses, somewhat higher temperatures in the range of 400–420° C. appear preferable. A temperature in the range of 400° C. gives good products with silica fibers.

For convenience, this process is normally carried out at approximately atmospheric pressure. However, it may sometimes be advantageous to employ pressures above or below atmospheric pressure to facilitate handling of chromyl chloride vapor. When such pressures are used, they will normally be less than 5 atmospheres and usually greater than 0.5 atmosphere.

The product of this invention is ferromagnetic chromium oxide having a purity of at least 90% and exhibiting on X-ray examination a pattern characteristic of the rutile-type crystal structure. The cell constants calculated from the X-ray pattern are $a_0=4.42\pm0.01$ A. and $c_0=2.92\pm0.01$ A. These products exhibit specific saturations per gram or sigma values of at least 70 gausses cm.$^3$/g. and usually inn excess of 80 gausses cm.$^3$/g., as determined at room temperature in a field of 2000 oersteds.

Products prepared in the presence of certain inorganic fibrous materials such as rutile titanium dioxide fibers and fibers of soft or heat-resistant glass exhibit very low coercive forces, i.e., coercive forces of 25 oersteds and below. It is a surprising fact that ferromagnetic chromium oxides having a specific saturation above 80 gausses cm.$^3$/g. and a coercive force below 25 oersteds can be obtained only when these inorganic materials are present in fibrous form.

Although the purity of the ferromagnetic chromium oxide produced directly by the process of this invention is adequate for many purposes, it is sometimes desirable to subject the product to a treatment designed to remove the inorganic fibrous material and any other non-magnetic contaminants which may be present. This may be conveniently accomplished by grinding the product to small particle size and separating the magnetic from the non-magnetic material by agitation in a magnetic field.

The process of this invention may be carried out in any equipment which provides for exposure of chromyl chloride to temperatures within the desired range in the presence of the inorganic fibrous substrate. It is convenient to conduct the process in a tube which may be constructed of glass, quartz, corrosion-resistant metals, or other materials resistant to chromyl chloride and to chlorine at the temperatures used. One end of the tube is provided with one or more gas inlets and the other end with a gas outlet connected to a suitable vent. If desired, provision may be made for removal and recycling of unconverted chromyl chloride in the exit gases.

The reaction tube is conveniently heated in an electric furnace and the temperature of the tube is measured by one or more thermocouples arranged along its length. For ease and precision in maintaining the desired temperature, it is desirable that the furnace have several individually controlled heating elements.

Chromyl chloride vapor is introduced into the reaction tube through the gas inlet. This vapor may be conveniently produced by dropping liquid chromyl chloride into a vessel maintained at a temperature somewhat above the boiling point of chromyl chloride. For example, the vessel may be surrounded with boiling tetrachloroethylene vapor. Alternatively, chromyl chloride vapor may be introduced into the reaction tube by use of an entraining agent such as oxygen or air, which is bubbled through liquid chromyl chloride maintained at a temperature sufficient to provide the desired vapor pressure.

The inorganic fibrous substrate is placed within the heated portion of the reaction tube. For ease in handling, it is desirable that the inorganic fibrous material be contained in a small vessel such as a combustion boat of quartz, glazed porcelain, platinum, and the like, or be supported on a frame constructed from platinum wire or quartz. Of course, the substrate may also rest directly on the wall of the reaction tube. Whatever the method of support employed, it is desirable that the inorganic fibrous material be in the form of a fluffy mass so that it is easily permeated by chromyl chloride vapor.

The flow rate of chromyl chloride vapor over the fibrous substrate does not require critical adjustment. For economy of operation, it is desirable that the flow rate be such that as much chromyl chloride as possible is converted to ferromagnetic chromium oxide per unit of time without substantial quantities of chromyl chloride being carried through into the exit gas. Optimum adjustment of the vapor flow depends on such factors as the size of the apparatus and quantity of fibrous material, and is readily determined by examination of the exit gas for chromyl chloride. Although not as economical, flow rates considerably above and below this optimum can be employed and will result in the production of high purity ferromagnetic chromium oxide.

The magnetic properties of the products of this invention may be conveniently determined on powders obtained by grinding the ferromagnetic chromium oxide produced in the reaction zone to small particle size. The magnetic properties which render these products particularly useful are the intrinsic force $H_{ci}$ and the specific magnetization or sigma value, $\sigma_s$. These properties are determined as described in U.S. Patent 2,885,365.

The chromyl chloride employed in the process of this invention can be of the usual commercial purity and need not be especially purified. The invention is illustrated further by the following examples in which the proportions of ingredients are expressed in parts by weight unless otherwise stated.

*Example I*

This example illustrates the preparation of ferromagnetic chromium oxide by thermal decomposition of chromyl chloride in the presence of fibrous titanium dioxide. A mass of titanium dioxide fibers placed loosely in a quartz boat was introduced into the reaction tube described above. The titanium dioxide fibers employed were less than 25 microns in minimum dimension and had an axial ratio in excess of 10:1. A substantial proportion of these fibers had an axial ratio in excess of 100:1 and were 1 to 5 microns in minimum dimension. These fibers were produced by reaction of titanium tetrachloride with oxygen at 600–800° C. in the presence of a molten mixture containing potassium chloride and sodium chloride in the proportion of 61:39 (by weight), as described in applicant's assignee's copending application of Kenneth L. Berry, Serial No. 761,700, filed September 18, 1958, now U.S. Patent 3,030,183.

A mixture of chromyl chloride vapor and oxygen was passed through the tube and into contact with the fibrous titanium dioxide for a period of 8 hours at a temperature of 380–390° C. in the presence of oxygen. During this period, a quantity of ferromagnetic chromium oxide equivalent to 25 times the weight of the titanium dioxide fibers was produced. This product was highly crystalline and many lustrous blades of ferromagnetic chromium oxide were visible. One of these crystals was removed from the mass and inspected by X-ray diffraction. It was found to be monocrystalline, i.e., to be composed of a single crystalline region with no intercrystal boundaries. The X-ray diffraction pattern was entirely free of any lines attributable to other oxides of chromium. This product had an intrinsic coercive force of 13 oersteds.

When the above procedure was repeated with the exception that treatment was continued for three periods of 8 hours each, i.e., for a total treating time of 24 hours, a quantity of ferromagnetic chromium oxide equivalent to 75 times the weight of the titanium dioxide fibers was produced. This ferromagnetic chromium oxide was in the form of a hard bar having a density of approximately 80% of the theoretical value. The surface of this bar was lustrous and presented a highly crystalline appearance. The product was high purity ferromagnetic chromium oxide having an intrinsic coercive force of 13 oersteds.

*Example II*

Using the procedure described above, chromyl chloride vapor was passed for a period of 8 hours over a mass of soft glass wool (20–25 microns in diameter) contained in a platinum boat and heated at 400° C. The glass wool increased in weight by 45-fold during this period due to the formation of a black, lustrous deposit of ferromagnetic chromium oxide. The product was shown by examination under a low power microscope to be highly crystalline. To remove the glass wool, the product was crushed, shaken in a magnetic field, the portion attracted by the field further ground in an agate mortar and the separation repeated. The resulting product was ferromagnetic chromium oxide of more than 95% purity and exhibited an intrinsic coercive force of 19–21 oersteds. The specific magnetization, $\sigma_s$ was 88 gausses cm.$^3$/g. measured in a field of 4000 oersteds at room temperature. After further grinding and magnetic purification, the product contained by analysis 60.61% Cr.

*Example III*

The procedure of Example II was repeated with the exception that glass wool, composed of heat-resistant "Pyrex" glass fibers having diameters in the range of 5–10 microns, was used in place of the soft glass wool of Example II. During 8 hours at 400° C., the weight of the glass wool was increased 45-fold by deposition of ferromagnetic chromium oxide, which was produced as a black, lustrous deposit. After magnetic separation as described in Example II, the product was ferromagnetic chromium oxide of better than 90% purity having an intrinsic coercive force of 21 oersteds.

*Example IV*

Following the procedure of Example II, chromyl chloride was thermally decomposed at 400° C. in the presence of silica-alumina fibers (average diameter about 10 microns) containing 96% silica. During 8 hours, the black, crystalline ferromagnetic chromium oxide was produced in an amount equivalent to 30 times the weight of the fibers employed. The product was ground and purified by magnetic separation as described in Example II to yield a powder consisting of ferromagnetic chromium oxide of better than 90% purity, which exhibited an intrinsic coercive force of 50 oersteds. By further grinding in a rotary agate mill, followed by magnetic separation, additional non-magnetic material was removed and the purity of the ferromagnetic chromium oxide increased.

*Example V*

Chromyl chloride was thermally decomposed at a temperature of 380° C. in the presence of commercial silica wool matting having fibers ranging from about 1 to about 5 microns in diameter. Ferromagnetic chromium oxide was obtained as a dull black magnetic mass in a quantity amounting to 27 times the weight of the silica fibers employed. This was crushed and magnetically separated to yield a ferromagnetic chromium oxide having a purity greater than 90%. This product had an intrinsic coercive forces of 48 oersteds and a specific magnetization of 83 gausses cm.$^3$/g.

*Example VI*

In this example, fibrous alumina prepared by heating aluminum with an inorganic compound containing Si—O bonds in the presence of hydrogen at a temperature above 1100° C. but below the melting point of alumina was employed as substrate. These fibers had at least one dimension less than 50 microns and one dimension greater than 50 microns, the average ratio of the longest and the shortest dimensions being at least 500:1.

A quantity of alumina fibers was placed in a platinum boat and employed in the thermal decomposition of chromyl chloride as described in Example V. Ferromagnetic chromium oxide was produced in an amount equal to 31 times the weight of the substrate fibers as a dull black, strongly magnetic mass. The crude product before magnetic purification contained 95% ferromagnetic chromium oxide and had an intrinsic coercive force of 43 oersteds.

*Example VII*

The procedure of Example II was repeated with the exception that a temperature of 420° C. was employed. During 8 hours, a quantity of ferromagnetic chromium oxide equivalent to 48 times the weight of the fibers was produced as a black, lustrous mass. The product was crushed and magnetically purified to yield ferromagnetic chromium oxide having a purity of 99% and exhibiting an intrinsic coercive force of 15 oersteds. Analysis showed the presence of 61.23% Cr on a bone-dry basis.

As mentioned earlier, the presence of an inorganic material in fibrous form during the thermal decomposition of chromyl chloride is an essential feature of this invention. The presence of inorganic material in non-fibrous form does not produce ferromagnetic chromium oxide in either the yield or purity that is obtained when fibrous material is present. For example, thermal decomposition of chromyl chloride as described in Example II using as substrate a glass plate comparable in dimensions to the mass of glass fibers of Example II produced only a very small quantity (about 1/60 of that obtained in Example II) of impure ferromagnetic chromium oxide (specific magnetization, $\sigma_s$, 55–60 gausses cm.$^3$/g.; intrinsic coercive force, 46 oersteds; purity about 65%).

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for producing ferromagnetic chromium oxide which comprises heating chromyl chloride for a time sufficient to form the desired product at a temperature within the range of 350–500° C. in the presence of a substrate constisting of inorganic fibers having a melting point above the reaction temperature, said fibers being composed of a material selected from the group consisting of titanium dioxide, alumina, soft glass, high silica glass, and boehmite.

2. The process as set forth in claim 1 wherein said fibers are less than 50 microns in the minimum dimension and have an axial ratio of at least 10:1.

3. The process of claim 1 in which the heating is effected at atmospheric pressure.

4. The process of claim 1 wherein said fibers have a minimum dimension of less than 10 microns and have an axial ratio of at least 100:1.

5. The process of claim 1 comprising the additional step of magnetically separating the reaction product from said fibers.

6. The process of claim 1 wherein said fibers are composed of a glass wool.

7. Process of producing ferromagnetic chromium oxide having a purity of at least 90% which comprises heating chromyl chloride to a temperature of from 350–500° C. for a time sufficient to form the desired product in the presence of a substrate consisting of alumina fibers.

8. Process for producing ferromagnetic chromium oxide having a purity of at least 90% which comprises heating chromyl chloride to a temperature of 350–500° C. in the presence of a substrate consisting of titanium dioxide fibers having a rutile structure for a time sufficient to form the desired product.

9. Process for producing ferromagnetic chromium oxide having a purity of at least 90% which comprises heating chromyl chloride in the presence of a substrate consisting of silica-alumina fibers to a temperature of from 350–500° C. for a time sufficient to form the desired product.

10. Process for producing ferromagnetic chromium oxide having a purity of at least 90% which comprises heating chromyl chloride to a temperature in the range of 350–500° C. in the presence of a substrate consisting of silica fibers for a time sufficient to form the desired product.

11. In the process for producing ferromagnetic chromium oxide by the thermal decomposition of chromyl chloride at a temperature range of from 350°–500° C., the improvement which consists of carrying out the process in the presence of a fibrous inorganic substrate, said substrate having a melting point above the reaction temperature and being selected from the class consisting of titanium dioxide, alumina, soft glass, high silica glass, and boehmite.

References Cited in the file of this patent

UNITED STATES PATENTS

| | | |
|---|---|---|
| 2,592,598 | Perrin | Apr. 15, 1952 |
| 2,823,117 | Labino | Feb. 11, 1958 |
| 2,885,366 | Iler | May 5, 1959 |
| 2,887,454 | Toulmin | May 19, 1959 |
| 2,915,475 | Bugosh | Dec. 1, 1959 |
| 2,956,955 | Arthur | Oct. 18, 1960 |

FOREIGN PATENTS

| | | |
|---|---|---|
| 1,154,191 | France | Oct. 28, 1957 |

OTHER REFERENCES

Guillaud et al., in Comptes Rendus, vol. 219, July 10, 1944, pages 58 to 60.